(12) United States Patent
Fraccaro et al.

(10) Patent No.: US 12,737,706 B2
(45) Date of Patent: Sep. 15, 2026

(54) INTELLIGENT MANAGEMENT OF WORKFLOW EXECUTION USING COMPUTATIONAL MODELING

(71) Applicant: International Business Machines Corporation, Armonk, NY (US)

(72) Inventors: Paolo Fraccaro, Warrington (GB); Julian Bertram Kuehnert, Nairobi (KE); Blair Nicholas Victor Edwards, Manchester (GB); Nikola Elvis Stoyanov, Warrington (GB); Nelson Kibichii Bore, Lessos (KE); Elise Jennings, Dublin (IE); Komminist Weldemariam, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 18/449,478

(22) Filed: Aug. 14, 2023

(65) Prior Publication Data

US 2025/0061399 A1 Feb. 20, 2025

(51) Int. Cl.
*G06Q 10/0633* (2023.01)
*G06N 5/022* (2023.01)

(52) U.S. Cl.
CPC ......... *G06Q 10/0633* (2013.01); *G06N 5/022* (2013.01)

(58) Field of Classification Search
CPC ....................... G06Q 10/0633; G06Q 10/0634
See application file for complete search history.

(56) References Cited

U.S. PATENT DOCUMENTS

| | | | |
|---|---|---|---|
| 5,874,955 A | 2/1999 | Rogowitz et al. |
| 8,812,403 B2 | 8/2014 | Mercuri |
| 9,703,606 B2 | 7/2017 | Balinsky et al. |
| 10,152,318 B2 | 12/2018 | Vadapandeshwara et al. |
| 2009/0199179 A1 | 8/2009 | Morris et al. |

(Continued)

OTHER PUBLICATIONS

S. Murumkar and C. Tayal, "Optimizing Big Data Workflows Using AI and Machine Learning," 2026 IEEE 16th Annual Computing and Communication Workshop and Conference (CCWC), Las Vegas, NV, USA, 2026, pp. 0550-0556, doi: 10.1109/CCWC67433.2026.11393891. (Year: 2026).*

(Continued)

*Primary Examiner* — Rutao Wu
*Assistant Examiner* — Zahra Elkassabgi
(74) *Attorney, Agent, or Firm* — Michael A. Petrocelli, Esq.; Matthew M. Hulihan, Esq.; Heslin Rothenberg Farley & Mesiti P.C.

(57) ABSTRACT

Intelligent workflow execution management includes generating, based on target output metrics for a geospatial-temporal modeling workflow, a collection of workflow execution control rules, monitoring execution of the workflow at runtime, the monitoring including monitoring intermediate output of the workflow execution and predicted output metrics, the predicted output metrics being metrics predicted to be obtained from completing the workflow, and determining one or more workflow execution intervention actions for an automated workflow orchestrator to take based on the defined target output metrics and the monitoring of the workflow execution.

16 Claims, 7 Drawing Sheets

(56) References Cited

U.S. PATENT DOCUMENTS

| | | | |
|---|---|---|---|
| 2019/0130325 A1 | 5/2019 | Stevens et al. | |
| 2020/0184376 A1* | 6/2020 | Parameswaran | G06N 20/00 |
| 2021/0019194 A1* | 1/2021 | Bahl | H04L 67/1031 |
| 2021/0132947 A1 | 5/2021 | John et al. | |
| 2022/0300812 A1 | 9/2022 | Yeleshwarapu et al. | |
| 2023/0083159 A1 | 3/2023 | Padmanabhan et al. | |
| 2023/0083891 A1* | 3/2023 | Achin | G06F 3/0484 715/762 |

OTHER PUBLICATIONS

Parker, S., et al., "Computational steering. Software systems and strategies," in IEEE Computational Science and Engineering, vol. 4, No. 4, Oct.-Dec. 1997, pp. 50-59.

W. Liu, et al., "Machine Learning-assisted Computational Steering of Large-scale Scientific Simulations," 2021 IEEE Intl Conf on Parallel & Distributed Processing with Applications, Big Data & Cloud Computing, Sustainable Computing & Communications, Social Computing & Networking (ISPA/BDCloud/SocialCom/SustainCom), 2021, pp. 984-992.

He, Y., et al., "Multi-objective efficient global optimization of expensive simulation-based problem in presence of simulation failures", Engineering with Computers, Mar. 11, 2021, 26 pgs.

* cited by examiner

INTELLIGENT MANAGEMENT OF WORKFLOW EXECUTION USING COMPUTATIONAL MODELING

BACKGROUND

Computational modeling is becoming increasingly important as a basis for decision making in various domains, such as climate and sustainability, finance, health, and others. Modeling frameworks, such as those deployed on hybrid clouds, have a strong potential to facilitate and accelerate modeling processes, even for users without expert knowledge in modeling and software engineering. Meanwhile, artificial-intelligence (AI)-driven workflows are increasingly being used to accelerate, optimize, and intelligently guide modeling tasks.

SUMMARY

Geospatial-temporal models and modeling add some complexity due to a number of factors. Examples include the use/need to process (i) relatively expensive datasets and models, (ii) contextual information, for instance contextual information based on geolocation or time of the year/month/day of interest versus event of interest, and (iii) types of analyses, such as climatological or seasonal forecasting composed of ensembles workflows, and potentially combined with risk compounding across different hazards. These factors are often pervasive and distributed across parallel workflows based on 'tile' or 'polygon' processing, for instance in the case of independent basins when flood risk modelling.

Shortcomings of the prior art are overcome and additional advantages are provided through the provision of a computer-implemented method. The method generates, based on target output metrics for a geospatial-temporal modeling workflow, a collection of workflow execution control rules. The method further monitors execution of the workflow at runtime. The monitoring includes monitoring intermediate output of the workflow execution and predicted output metrics. The predicted output metrics are metrics predicted to be obtained from completing the workflow. Additionally, the method determines one or more workflow execution intervention actions for an automated workflow orchestrator to take based on the defined target output metrics and the monitoring of the workflow execution.

Additional aspects of the present disclosure are directed to systems and computer program products configured to perform the methods described above and herein. The present summary is not intended to illustrate each aspect of, every implementation of, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for managing workflow execution, for example optimized intelligent management of complex geospatial-temporal workflows based on a smart feedback loop and workflow execution control rules, examples of which include static and dynamic learned rules to facilitate workflow management.

Figure 1:
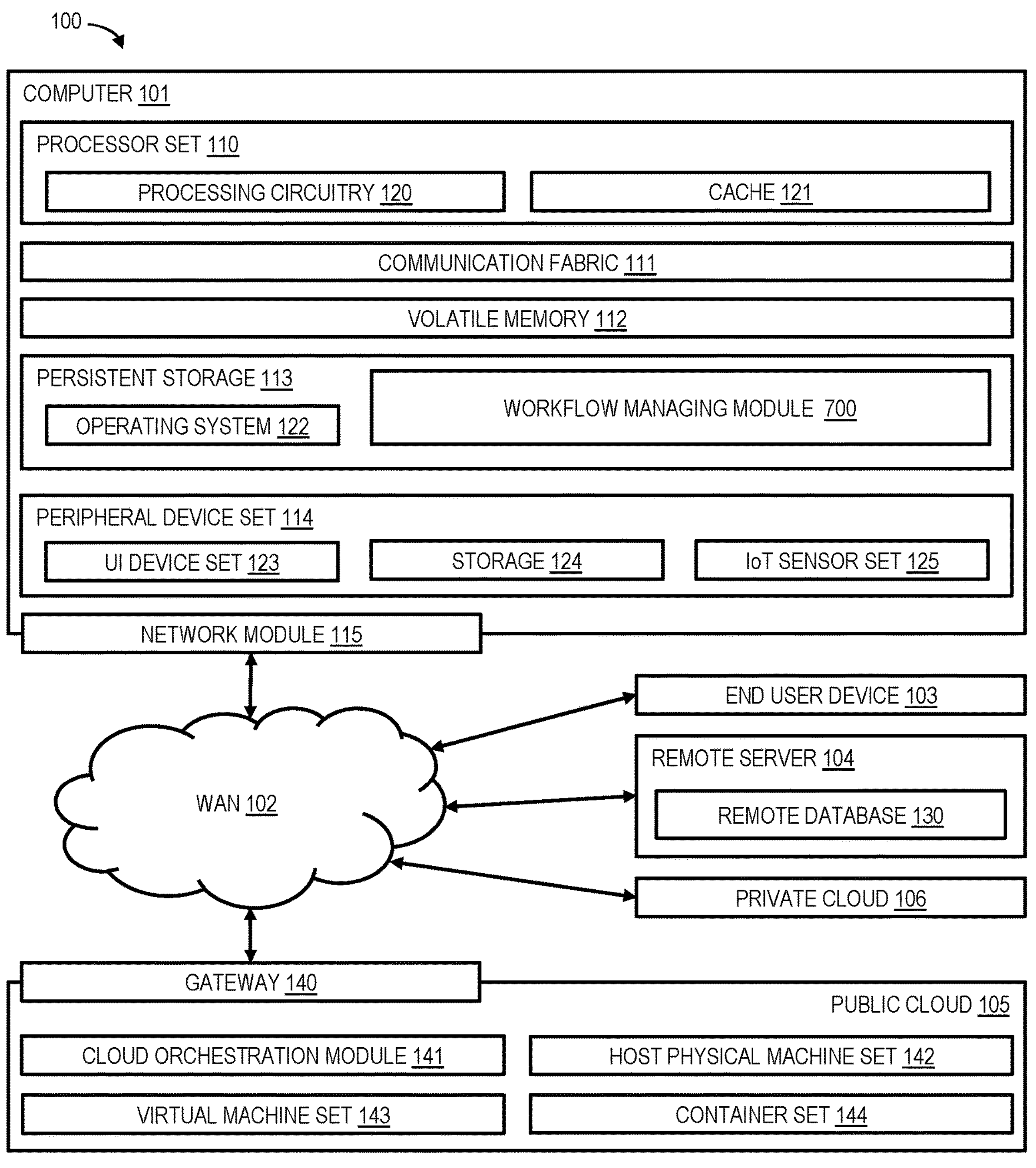
FIG. 1 depicts an example computing environment to incorporate and/or use aspects described herein.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing aspects of the present disclosure, such as workflow managing module 700. In addition to block 700, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 700, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 121 and the other storage media discussed below. The program instructions, and associated data, are accessed by processor set 110 to control and direct performance of the disclosed methods. In computing environment 100, at least some of the instructions for performing the disclosed methods may be stored in block 700 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 700 typically includes at least some of the computer code involved in performing the disclosed methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the disclosed methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Modeling pipelines (e.g., in a complex geospatial-temporal domain) tend to be computationally highly expensive. Computational resources are often wasted when the execution of a model run (e.g., as a workflow) is interrupted or when the model configuration, such as workflow settings, input data, model parameters, etc., result in empty, non-physical model outputs or outputs that fail to contribute useful information to the end results in which a workflow requester, such as a user, is interested. Such unsatisfactory workflow processing consumes resources of the system and can adversely affect and compete with other workflows that might provide good/desirable results. Large workflows generally execute end-to-end once submitted, even if run in parallel with nested or conditional loops, and in these situations there is no update during runtime for new, relevant information that might be coming in.

Conventional approaches fail to include logical means to make inferences from previous model runs and learn the likely result of given model configurations, for instance whether it is likely prone to failing or generating unusable/undesirable results or, or, on the contrary, it is likely to lead to positive/desirable results. Executing some workflows can be expensive. There are situations where a collection of workflows are to run, for instance in order to evaluate an ensemble risk across a domain space. Each workflow of the collection might need to run across a configuration space that is meaningful in terms of generated output. It is undesirable to consume resources executing iterations of the workflows under configurations that are not expected to generate useful output. Sometimes it can be determined based on the configuration itself, prior to executing the workflow, that execution of the workflow is likely to be of little value, though in other situations this cannot be determined until the workflow has begun executing, producing intermediate results/outputs, and a predictions can be made as to workflow output.

Aspects described herein present approaches, systems, and methods for optimized management of workflows, for instance complex geospatial-temporal workflows that execute to perform geospatial-temporal modeling, based on a smart feedback loop using workflow execution control rules, including static and dynamic learned rules to manage the workflows. In some embodiments, a process defines target metrics for model output in complex geospatial-temporal modeling workflow/tasks. The metrics could reflect undesired and/or desired output through thresholds, ranges, and/or other data. In examples, metrics reflect what that to which the user is steering workflow execution toward and would expect or like to see in terms of output, for instance. Metric(s) could be defined via an objective, such as an objective to achieve a mean-squared error below a given threshold, for example. Metrics could also define or be based on acceptable or unacceptable ranges. Based on these target metric outputs for the workflow, the process generates a collection of workflow execution control rules, which include static execution control rule(s) and dynamic execution rule(s), that are used to control workflow execution to enforce target metrics. A static control rule might indicate that if precipitation input (provided as part of a workflow configuration) is equal to 0, do not initiate execution of the workflow because the resulting output will never reach the objective. A dynamic control rule might be built from learning a threshold value of a given variable, where when the variable is above that value, execution of the workflow to completion is likely to result in a failure or other undesirable output. The dynamic control rule might indicate that workflow execution is to halt if the variable value exceeds the threshold at any point during workflow execution.

The process monitors and analyzes ongoing execution of the workflow at runtime, which includes monitoring intermediate output of the workflow execution (for instance output from intermediate tasks, of the executing workflow, that are used in processing later tasks of that workflow) well as predicted output metrics. The predicted output metrics are the metrics that are predicted to be obtained from completing the workflow, i.e., completing the run of the workflow from start to finish. As described below, a given workflow might undergo iterations (runs) of execution under various scenarios, for instance various workflow configurations. A process can monitor the workflow execution during these runs, identify intermediate output during each run, and confidently predict the output metrics that will result if the workflow is executed to completion. Based on the defined target output metrics and this monitoring and analysis, the process can determine whether to intervene, for instance to take workflow intervention actions by modifying workflow task(s) and/or configurations for execution. The workflow execution intervention actions can be anything that a control component, for instance an automated workflow orchestrator, might take in reaction to partial or completed execution of the workflow during any one or more runs. Options include allowing the workflow execution for the given run to progress as-is (using the current configuration), or halting workflow execution, and possibly restarting execution of the workflow, either from the beginning of that run or a checkpoint within the workflow, with a different workflow configuration.

Figure 2:
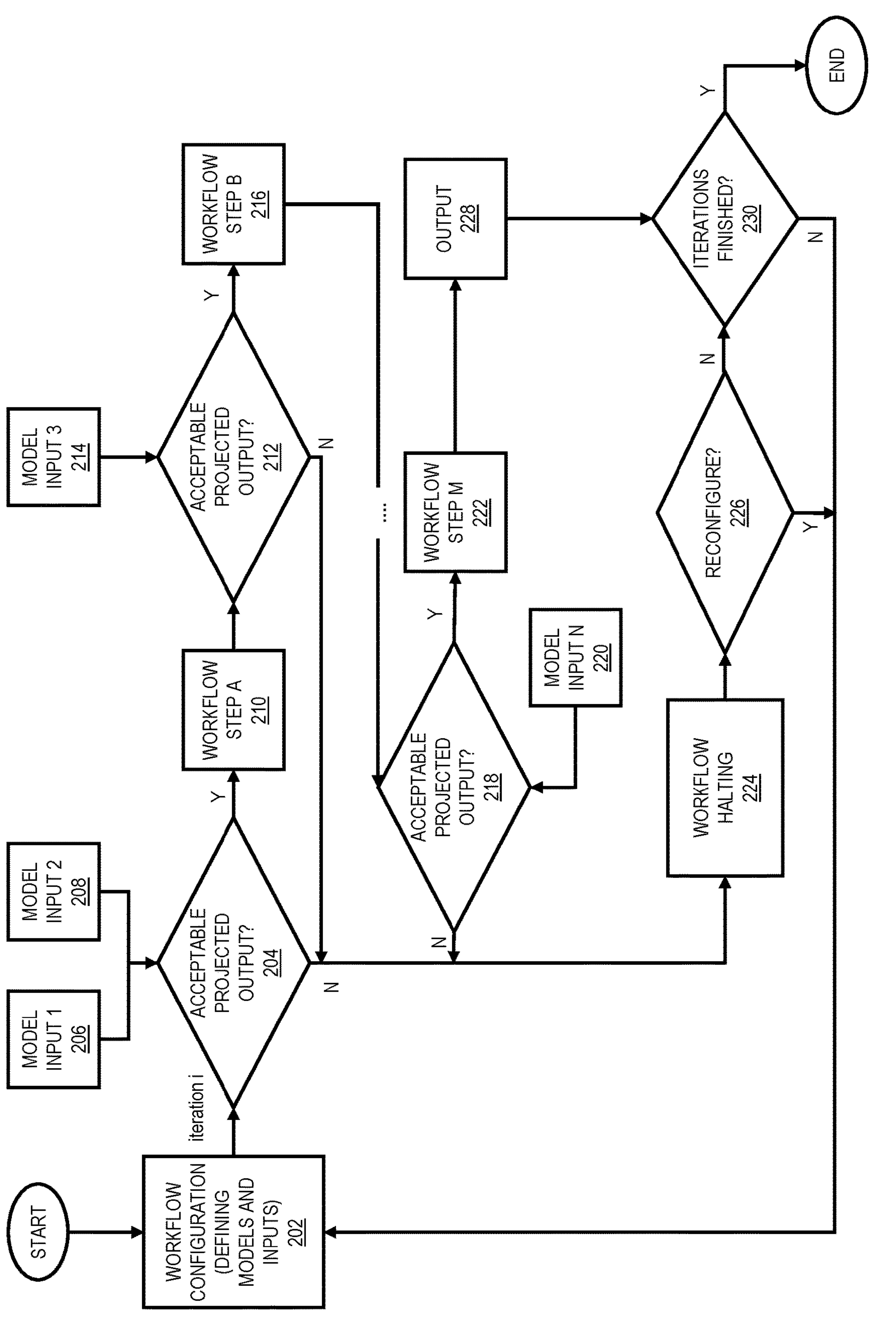
FIG. 2 depicts an example flow for iterative workflow execution in accordance with aspects described herein.

FIG. 2 depicts an example flow for iterative workflow execution in accordance with aspects described herein. The flow follows the iterative execution of a given workflow, the monitoring of that workflow, and the potential for taking workflow execution intervention actions as described. The flow utilizes workflow configurations 202 that define models and inputs for the workflow. These inform configuration for workflow execution, which proceeds through iterations. The number of iterations can vary for different workflows, configurations, and so on. This number could also vary dynamically depending on results are that obtained along the way. Further, different iterations can use different configurations, though it might be desired in some circumstances to perform multiple iterations of the workflow with the same configuration.

In any case, an iteration of workflow execution can proceed through workflow steps, which are, for example, modeling tasks. At a given iteration i, there can be an initial check 204 whether to begin executing the workflow steps.

This check can be based on model inputs 206, 208 taken from the given workflow configuration used for this iteration i. In embodiments, this check 204 is useful after there have been some iterations of the workflow execution and therefore some experience with the workflow has been gained, as explained herein. However, it is possible that even without prior execution(s) of the workflow the process might determine, based on the given workflow configuration and parameters used for this initial iteration, whether or not execution of the workflow under that configuration is expected to produce to some useful output. If the check 204 indicates an acceptable projected (predicted) output (204, Y), the flow proceeds to 210 for execution of the first workflow step A. If instead the check 204 determines something other than an acceptable projected output (204, N), the flow proceeds to workflow halting 224, at which point the workflow execution (i.e. under this iteration) is halted. There is a check 226 whether to reconfigure the workflow configuration, and if so (226, Y), the flow proceeds back to 202 with a reconfigured workflow configuration and to re-initiate execution of the workflow. If instead it is determined at 226 not to reconfigure the workflow configuration (226, N), the flow proceeds to 230 to determine whether to stop iterating through workflow executions.

Assuming it was determined at 204 to proceed with execution of the workflow under this configuration for this iteration (204, Y), the flow proceeds to 210 for execution of the first workflow step A. The execution of this step might produce intermediate results/output of this workflow execution. A check (212) is again made as to whether continued workflow execution under this iteration is expected to result in an acceptable projected (predicted) output. This check 212 can be based on other model input 214 that is to be used in proceeding with this workflow execution, for instance in the next or a later workflow step. Additionally, the check 212 can account for the intermediate results produced by the current run thus far, i.e., from executing workflow step A. If instead check 212 determines something other than an acceptable projected output (212, N), the flow proceeds to workflow halting 224 for processing as described above (halting, checking for reconfiguration, etc.). Otherwise, if acceptable output is projected (212, Y), the flow proceeds to 216 for execution of the workflow step B.

The flow proceeds as above for any number of workflow steps. Here, there is a final check 218 accounting for input 220, follows by performance of a final workflow step 222. In this manner, there are checks between workflow tasks, the checks analyzing projected output metrics and/or intermediate results, and determining whether to halt execution of the workflow under the run with the current configuration. If a decision is made to halt, there is a decision whether to reconfigure and try again. Otherwise, the flow proceeds to check (230) whether there are additional iterations to test.

If a workflow runs to completion, this results in actual output metrics 228 of the completed workflow execution run. If the desired iterating is not finished (230, N), the flow proceeds back to 202 to initiate a next iteration. Once there are no more iterations (230, Y) to run, the process ends.

The iterations can correspond to a sample or configuration space. For instance, a user might decide to run 100 trials in which one or more variables (such as a rainfall amount input and other parameter(s)) are set to different values. The workflow execution can be commenced to run through these in iterations. As another example, the iterations could explore potential solutions of an objective function to reach a certain output objective. Different iterations could test different configurations. Meanwhile, within a given iteration, some intermediate results or analysis being performed during the workflow execution might inform a tweak to the configuration on a given iteration; the tweak could be made (via 226, Y) and the workflow execution could be reinitiated under the tweaked configuration, all within the context of the given iteration being tested, or a tweak could be made to a configuration to be used in a subsequent iteration.

Accordingly, at each of multiple states within a workflow execution run, a question/check could be raised as to whether the predicted output of that run is acceptable. In embodiments, this is answered by an AI model, for instance a Bayesian neural network model. The model can be trained on previous state inputs, including input data/workflow configuration, static rules, dynamic rules, and overall workflow output/results, as described herein.

Figure 3:
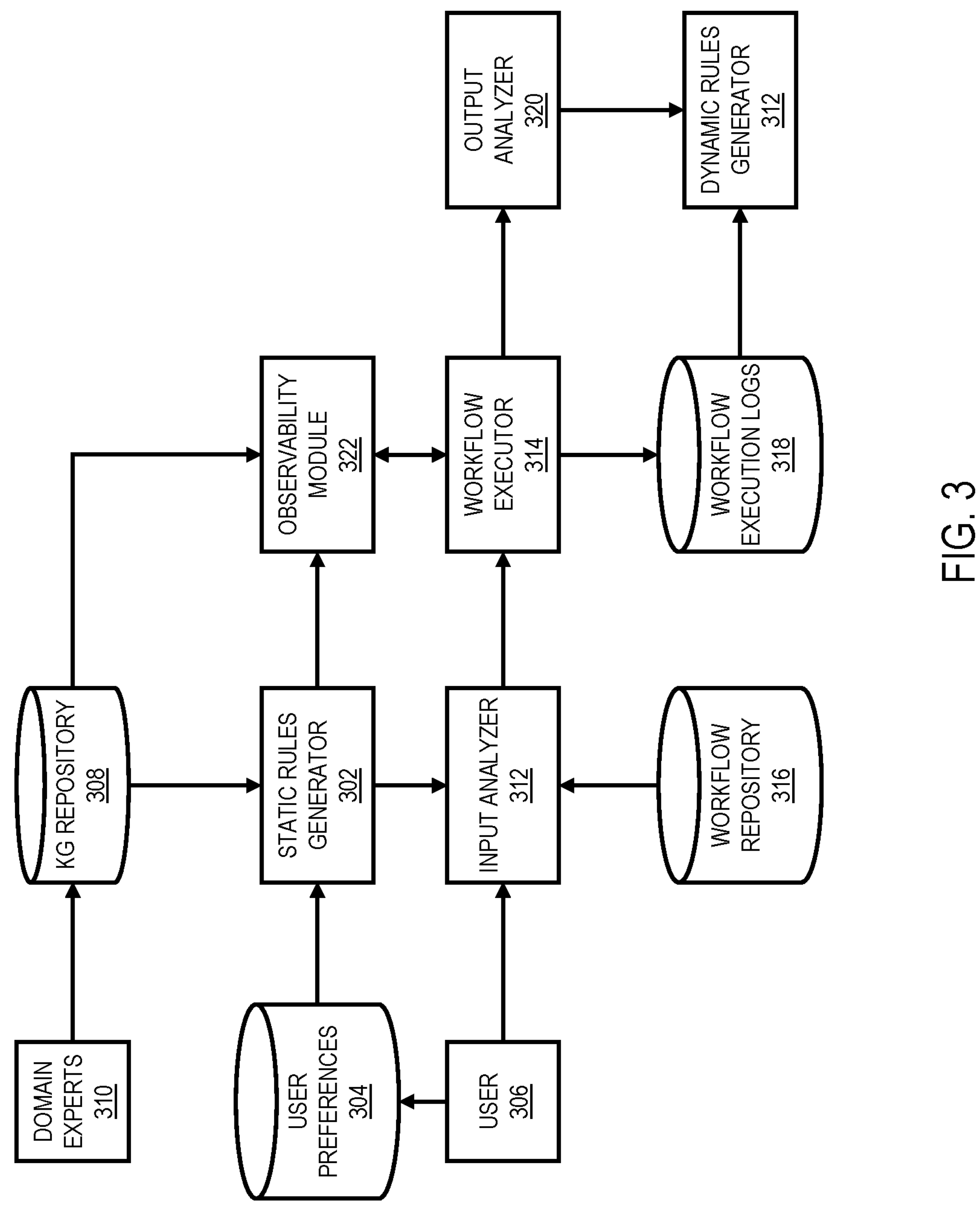
FIG. 3 depicts a component diagram for optimized workflow management in complex geospatial-temporal modeling, in accordance with aspects described herein.

Further details of optimization and management of workflow execution in accordance with aspects described herein are described with reference to FIG. 3. This is facilitated by way of workflow execution control rules that are generated. In one aspect, a static rules generator 302 generates static execution control rules, for instance halting rules to halt or prevent workflow execution under a current configuration or context from proceeding. The static rules generator 302 generates static execution control rules based on user preferences 304 from a user 306 and knowledge graphs from a repository 308 informed by domain experts 310. The generated static execution control rules are applied by an input analyzer 312, for instance to check based on a current workflow configuration whether a workflow executor 314 (workflow orchestrator, for instance) is to commence execution of an input workflow from workflow repository 316, and, if so, initiate commencement of that workflow execution by the executor 314. If an input workflow configuration is known or confidently predicted to result in an undesired output, such as one that will produce output, if any, that is of little or no value, the input analyzer might determine that executing the workflow under that configuration is a waste of resources.

In one aspect, a dynamic rules generator 312 generates dynamic execution control rules. These too can be halting rules. The dynamic execution control rules are learned via AI model(s) that are trained/built from results/outputs of prior workflow execution, provided by logs 318, and analysis thereof provided by output analyzer 320. The AI model(s) can predict final workflow output metrics, for instance based on intermediate output (output from steps/tasks of the workflow as it executes) and completed workflow outputs. The dynamic execution control rules are applied, alongside the static rules, by an observability module 322 that executes at runtime during the workflow execution. The observability module 322 can interact with the workflow executor to check workflow execution intermediate outputs during runtime and determine (based on the execution control rules) whether to halt the workflow execution and/or suggest changes to workflow configurations that can lead to better results.

Figure 4:
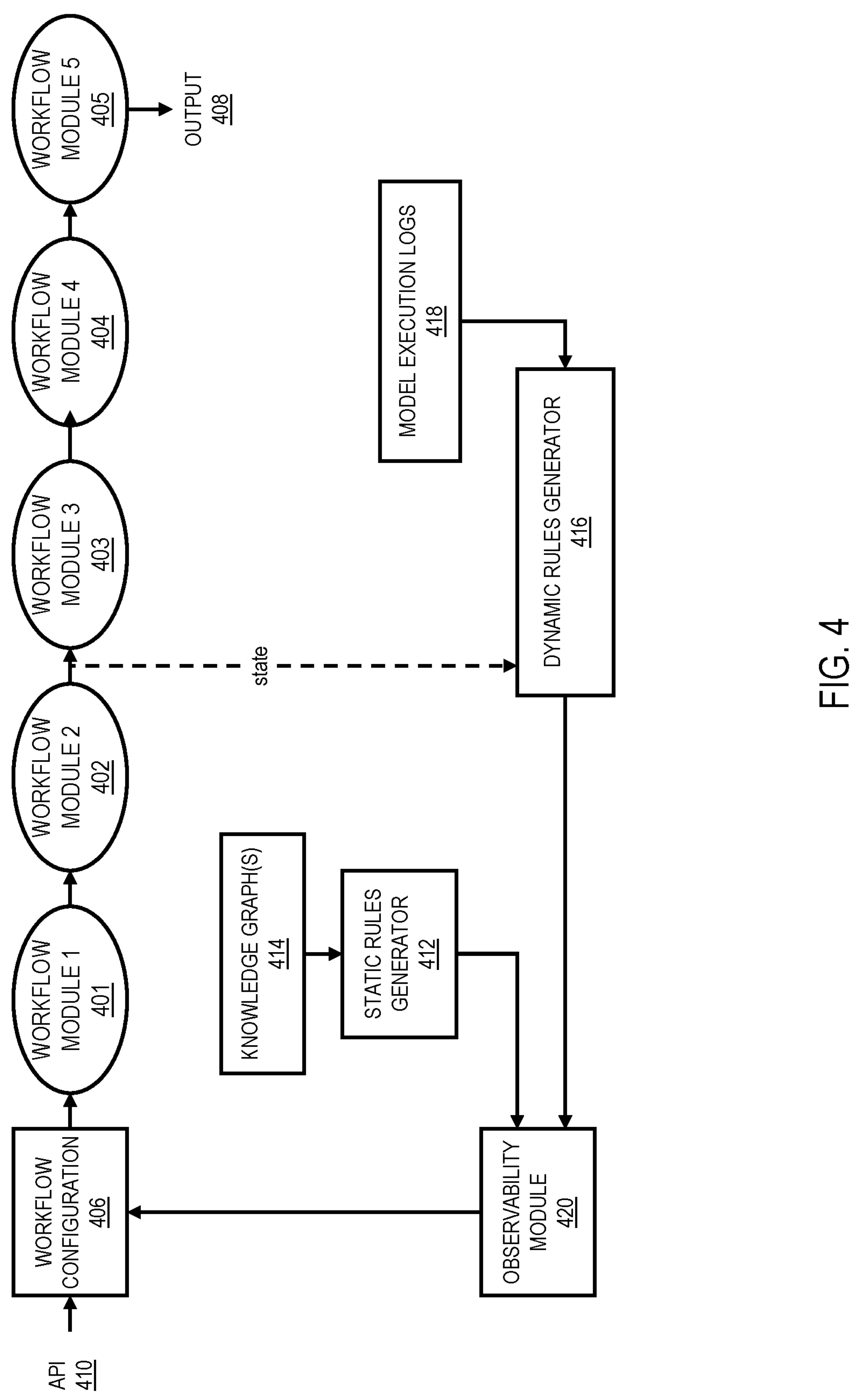
FIG. 4 depicts an example workflow-implemented modeling pipeline and integration thereof with components for optimized workflow management, in accordance with aspects described herein.

A proposed smart feedback loop can be implemented as described herein. Some examples are presented in the context of climate impact simulation modeling workflows use case, however aspects described herein, including such a smart feedback loop, could be used for other complex workflow-based modeling, including other geospatial-temporal workflows. FIG. 4 depicts an example workflow-implemented modeling pipeline and integration thereof with components for optimized workflow management, in accordance with aspects described herein. Specifically, FIG. 4 depicts workflow execution with integrated operation of three main modules—the two rules generators and the observability module. A modeling pipeline is represented by five modules (401, . . . , 405) of a workflow for execution pursuant to an input workflow configuration 406. Completed execution of the workflow produces output 408. An application programming interface (API) 410 is an interface for a user to submit tasks (requests for workflow execution and/or payloads for the workflow, such as the configurations to use, as examples).

The static rules generator 412 takes in user preferences/specifications, for instance geospatial context and indications of outputs of interest like flood areas greater than a given threshold area or average flood depth above a given depth, as examples. The user preferences could be provided via different modalities, for instance as JSON, XML, or YAML files. Below is an example specification of user preferences:

```
{
  "spatial_domain": ["19.300", "72.900", "19.720", "74.920"],
  "start_date": "2018-07-01T00:00:00Z",
  "end_date": "2018-07-20T00:00:00Z",
  "model": IFM;
  "earliest-iteration-stop": 10
  "input-data": {
    "precipitation": "CHIRPS";
    "precipitation-threshold: >10 mm/d"
  }
  "output-data":
    "flood-depth": >0.15m;
    "flood-area": >25 km2;
    "accuracy":>0.95
  }
}
```

The static rules generator 412 can analyze user-supplied preferences to extract user contextual factors that inform a workflow execution context, e.g., bounding box, period, preferred data sources, and preferences on input (e.g., minimum precipitation) and output data (e.g., minimum accuracy or outcome of an interest occurrence), as examples.

The static rules generator 412 integrates this information with other contextual details that inform workflow execution context and that are gathered from knowledge graphs 414 informed by domain experts, i.e., domain expert knowledge encoded as knowledge graph(s). Given a spatio-temporal domain and model of interest, the knowledge graphs can indicate/identify useful context, for instance the best data sources to use, acceptable model configurations, and other parameters/inputs. Using applicable knowledge graph(s), the static rules generator 412 generates static execution control rules. The rules may be based on rule templates that can be applied. An example of a rule template is given as follows:

ruleTemplate: boundingBox in [range1] data in [range2] accuracy in [range3]

where range1, range 2, and range3 represent values (from domain experts for instance) and these are used to parameterize a target output metric, i.e. the function 'boundingBox'. The static rules generator 412 could, in embodiments, generate two rules in this instance—one with the range values populated from knowledge in the knowledge graph(s), and another with the range values populated from user defined values. The two rules could then be passed to the input analyzer for use in checking whether or not an input workflow should commence execution. In embodiments, the rules could also be passed to the observability module for checking during the workflow execution if commenced. Continued execution of the workflow could also inform thresholds, for instance alternative (e.g., refined) numbers for these range values, to use going forward. These can be implemented in dynamic execution control rules or used to refine static execution control rules, if desired.

The dynamic rules generator 416 analyzes model execution logs 418 from prior workflow runs. The logs 418 could include results from prior workflow executions (both that completed and that were halted), as well as intermediate outputs obtained during those executions. Example intermediate results (for instance as illustrated in FIG. 4 after module 2 402 has executed) could be current rainfall distribution, flood difference relative to the prior workflow step (between workflow modules 1 and 2), and other updated parameters.

The analysis by the dynamic rule generator 416 could inform training of AI model(s), for instance Bayesian neural network(s) based on deep learning, that project workflow progression a number of steps (and possibly up through workflow completion) and predict/estimate output metrics of interest. The associated uncertainty of such predictions can decrease as workflow execution of this run proceeds further along toward completion.

The greater the number of times the workflow is executed, wholly or partially, and with varying workflow configurations, the more accurate the AI prediction model(s) are expected to be. The generation of the dynamic execution control rules by rules generator 416 may therefore advantageously be informed and improved by iterative workflow execution under different configurations. During each iteration, predictions as to the output metrics expected on workflow completion can be made at various points (e.g., between workflow steps, tasks, modules, or the like) and based on the intermediate outputs collected. A cost/benefit comparison can be performed at each such point to determine whether or not to continue on with the current workflow run, halt and reconfigure the run, inform a new configuration to use for this or a different iteration, etc. As part of this, dynamic execution control rule(s) can be built, and this is an ongoing process in which dynamic rules are generated on-the-fly as the workflow is run through iterations.

Accordingly, in some aspects, a process iterates execution of the workflow with different workflow configurations. At each iteration, the process predicts, using an AI model trained to predict output metrics, output metrics at the iteration based on intermediate output of the workflow execution at the iteration, and compares, using the predicted output metrics at the iteration, the option of allowing the workflow execution at the iteration to proceed to an end of the workflow with/against the option of halting, reconfiguring, and re-initiating workflow execution from a prior point of the workflow (e.g., the beginning or a checkpoint within the workflow, for instance) using a different workflow configuration. The process can build dynamic execution control rule(s) based on thresholds derived from this iterating. As one example, the AI model might learn that if, at any point during workflow execution, a specific parameter falls below a given (learned) threshold, then workflow output is highly likely to be undesirable. This knowledge could be used to generate a dynamic execution control rule that checks the parameter at each checkpoint during workflow execution and halts workflow execution (of that run and/or subsequent runs) if the parameter falls lower than the threshold.

The cost-benefit comparison can be performed at multiple points during workflow execution in each iteration. These points can correspond to defined checkpoints or inherent divisions between workflow steps, as examples.

For a given workflow, particularly one for which there may be no historical execution data, an AI prediction model could be trained from iterating through configurations of that workflow. The first several iterations could use configurations that are largely guesses, and may or may not produce useful results. Eventually, after a number of iterations, for instance 10, the processing will learn how various configuration parameters affect outputs. This information can be extracted by an AI model to learn how to better configure the parameters, inputs, etc. within the workflow configurations in order to lead to improved output metrics, i.e., those toward the target output metrics desired. Dynamic execution control rules can be generated and can also be built to suggest changed workflow configuration(s) to use in a subsequent execution of the workflow. And, while an AI model for application to a given workflow at hand can be trained based on execution of that given workflow, useful training information and/or initial AI models themselves could be extracted by learning from other workflows, for instance ones that share similarities to the given workflow at hand. In this manner, the learning from on a workflow or set of workflows might be more generally applicable to other workflows that are later encountered, and therefore inform workflow configurations for executing those workflows or initial AI model parameters to use with the new workflows. There might, for instance, be information in relevant workflow execution logs or knowledge graphs associated with other workflows that are useful for training purposes.

As previously mentioned, predicted output metrics can inform a cost-benefit analysis, for instance one that compares (i) a cost of resource utilization if concluding the workflow simulation, i.e., a cost of resources if the workflow were allowed to proceed at this point to the end against (ii) a projected benefit/value/improvement of the metric(s) of interest that would be gained based on the intermediate result. Based on declared user preferences (e.g., via an input configuration) and feedback provided by the user at the end of each workflow iteration, or based on user actions, such as if the user re-ran the workflow with a different configuration, the dynamic rule generator 416 can derive thresholds that can be applied to generate the dynamic rules to manage workflow execution. Management of workflow execution can include, but is not limited to halting and suggesting workflow configurations. Thresholds on different output metrics of interest could be derived by clustering predicted metrics against the intermediate and final (actual) outcomes of the workflow, including positive/negative feedback from the user or re-configuration by the user, to identify similar and/or divergent cohorts/subgroups. In other words, with iterations of the workflow under various configurations and the outputs of those tunes, and with feedback from a user or other entity, this information can be gathered together and grouped/clustered to make informed decisions about halting and reconfigurations to undertake in various situations, and dynamic rules to enforce those actions.

Figure 5:
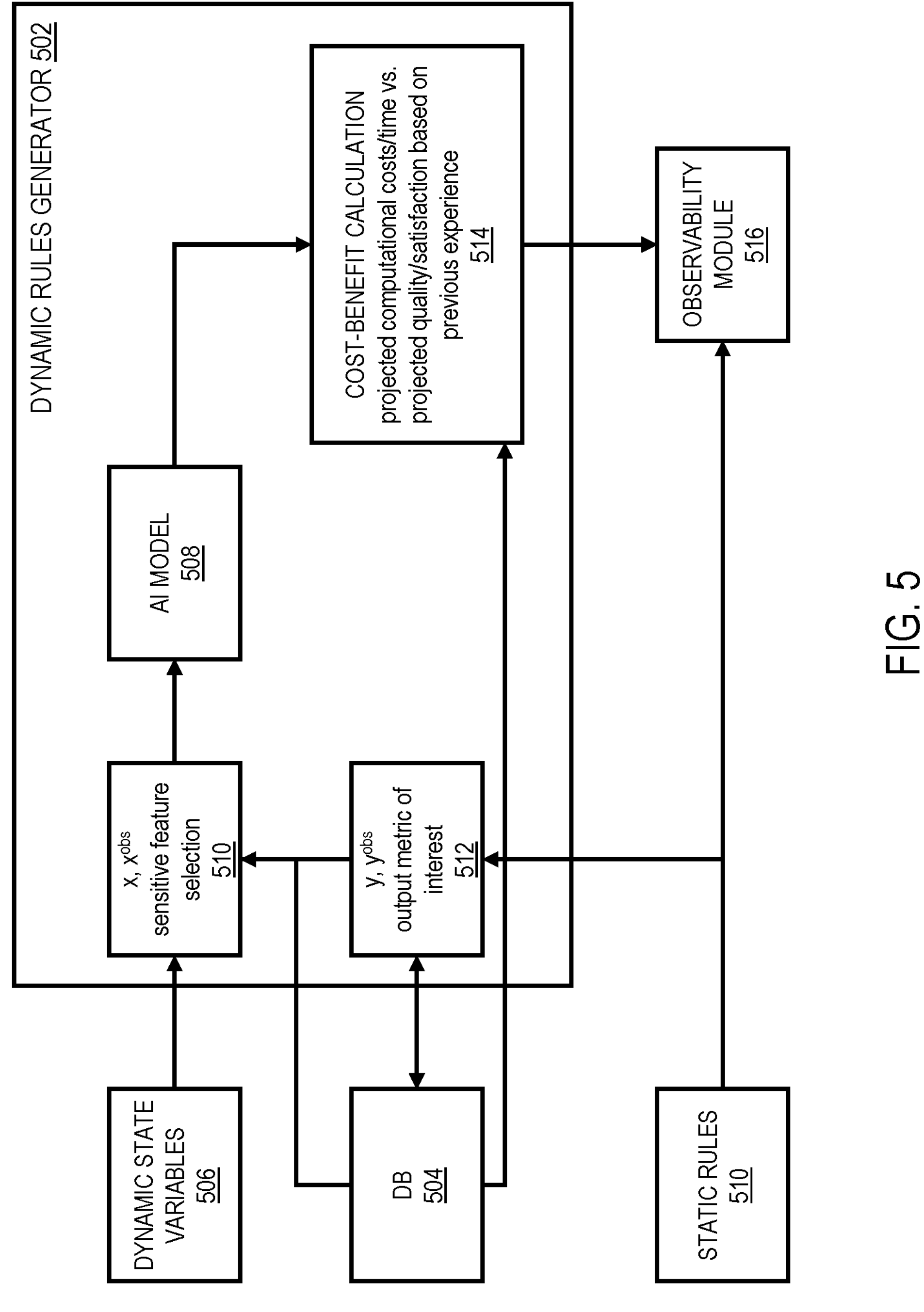
FIG. 5 depicts further details of a dynamic rules generator and its relation to associated components described herein.

FIG. 5 depicts further details of a dynamic rules generator and its relation to associated components described herein. Dynamic rules generator 502 takes input from a database 504, the input including model metadata, execution logs from execution of workflows implementing models, input features, and output metrics, as examples. The dynamic rules generator 502 also takes input in the form of dynamic state variables 506, for instance current flood extent, water depth, and change rate variables, in the context of a flood risk modeling example.

The dynamic rules generator 502 includes an AI model 508, for instance a Bayesian neural network, that is trained based on the inputs 504, 506 and static rules 510. Training maps input features 510 to outputs (output metrics 512) in order to learn how to predict output metrics from given input features. In iterating through workflow configurations, this provides observed outputs based on given observed inputs/features. The observed input features and outputs observed based thereon are ground truths used in training. In this example, y_obs and x_obs are ground truths, and training trains the model 508 to intake a new x and predict the output metric y, given the input x, without having to execute the workflow to completion. Static rules 510 can help inform output metrics of interest, for instance those related to topography or land use coverage, using the flood risk example. Continuing with the flood risk example, the AI model might predict a projected flood extent, or a probability of a target structure being flooded, for instance.

The cost-benefit calculation 514 can evaluate the projected resource consumption (computational cost and time) of continuing workflow execution under the current configuration cost against the projected quality/satisfaction to be gotten from continuing workflow execution, as informed based on prior experience (previous runs). This involves both predicting what the output metric will be and evaluating whether it will be of value. The lower the quality of the predicted result and the higher the resource consumption, then the more likely it is that the cost/benefit calculation will determine to halt workflow execution. The generated dynamic control rules informed from the AI model learning can be provided, with the static rules 510, to the observability module 516.

Referring back to FIG. 4, observability module 420 can apply the workflow execution control rules to workflow execution. In examples, a workflow orchestrator responsible for orchestrating workflow execution includes the observability module 420, though in other examples the observability module 420 is implemented in another component. In any case, the observability module 420 performs monitoring of the execution of the workflow during runtime, and uses/applies the generated collection of workflow execution control rules to determine the workflow execution intervention actions. Application of the rules might use the inputs to the workflow and tasks thereof, intermediate outputs, and the predicted output metrics. The observability module can evaluate predicted workflow success, where the predicted success is based on the output metrics that are targeted, as reflected by the control rules. This can be done at numerous points during workflow execution. Further, the trajectory of the predicted output metrics during execution of a workflow can be assessed. By measuring the trajectory (which measurement uses regression models in examples), and based on whether the workflow satisfies the execution control rules or reaches target output metrics, the observability module can halt (or initiate the halting with an orchestrator) the workflow execution before completion of execution thereof to the end of the workflow. The observability module can leverage knowledge gained from previous successful (or unsuccessful) workflow runs, including the iterative sensitivity analyses runs described above that can alter input parameters based on such knowledge, to suggest, for the given workflow at hand, different workflow configurations that are expected and likely to lead to positive results. The module could apply knowledge about how altering different parameters affects output metrics of the workflow, which could be used to desirably reconfigure workflow execution (by way of the workflow configuration) and steer the workflow's execution to producing desired outputs, i.e., target output metrics. As described above, the observability module can operate during workflow runtime and determine (and potentially take) workflow execution intervention actions at any desire point, for instance at checkpoints and/or between individual workflow tasks and based on the state of the workflow execution as informed by intermediate outputs thereof. A workflow execution intervention action could be to resume and allow execution of the workflow to proceed further under the given configuration. As another option, the action could be one that halts the workflow execution, for instance based on the intermediate output and/or predicted output metrics, to avoid unnecessary resource spend related to that run. Further, an action could include changing a workflow configuration according to which the workflow is executed, and/or reinitiating workflow execution, either with the changed workflow configuration or a different workflow configuration.

There may be situations in which a workflow orchestrator orchestrates the execution of a collection of workflows. In these situations, and based on observing the trajectory of a given workflow in terms the predicted output metrics of that workflow if allowed to execute to completion of the current run, the observability module could use this to prioritize execution of the workflows that is orchestrates. For instance, it could prioritize execution of workflow(s) that are likely (based on the predictions) to reach their target output metrics and provide desirable results, and penalize (deprioritize) execution of workflow(s) that are unlikely to be reach their target output metrics and provide undesirable results. In this manner, workflow execution intervention actions can include a decision to change execution priority of any one or more workflows under orchestration.

In accordance with aspects described herein, target output metrics are defined for workflow desired output in performance of complex geospatial-temporal modeling tasks, and workflow execution control rules are generates based on these metrics. In some examples, a user defines static execution control rules using an interactive user interface and/or an expected format, such a JSON, XML, or YAML, as examples. Additionally, a process can use a knowledge graph repository to extract constraints and additional domain rules based the context of geospatial-temporal models to be executed to inform static rule generation.

Dynamic control rules can also be generated, for instance using thresholds on output metrics of interest, as informed from iterative workflow execution, where drift in predicted output metrics (relative to target output metrics) can be analyzed along with a cost-benefit analysis of predicted model output and ongoing resource utilization.

In embodiments, domain knowledge is used to inform the generation of some execution control rules. Optionally, users, for instance domain experts, could enforce workflow halting specification constraints by defining rules that help identify and enforce critical execution paths and model components.

In further aspects, a process monitors and analyzes ongoing model execution and intermediate outputs. The process might initially apply static execution control rule(s) defined on the input workflow configuration and intermediate outputs (e.g., precipitation below a certain threshold, value of event of interest below a specific threshold at some iteration number, missing precipitation value for a given period, etc.). Then, over time as more simulations/iterations of the workflow are run, a process can train one or more AI models to predict output metrics of interest based on the iterations, with uncertainty decreasing the more iterations are run.

Thresholds on output metrics can be checked at various points to determine whether the predicted output metrics are likely to be satisfactory at the completion of the workflow. The number of iterations and workflow configurations for those iterations could be prespecified, at least in part, and/or dynamically selected at least in part. Based on the actions of a user (or an automated AI agent) and their feedback, if any, after iteration(s) of the executing workflow, the process can train an AI model that predicts whether the user (or AI agent) will be satisfied at the end of the iterating, for example predict whether the user or AI agent is expected to re-run the workflow with a different input configuration and/or whether the predicted output metrics are expected to be satisfactory to meet target output metrics.

Aspects can monitor and detect data shift from iterating and/or via an AI prediction model which could adversely affect the distribution of data of iterative runs and/or intermediate outputs corresponding to target output metrics, and lead to workflow performance degradation resulting in undesired predicted outcomes. In the context of a flood risk example, a process might determine a new precipitation distribution demonstrative of a shift toward more or less precipitation, and then relate that shift in the precipitation distribution to a shift in flood risk.

The workflow execution can be monitored in embodiments by employing a centralized multi-agent-based observability module for the iterative processing. As explained above, the observability module can use historical runs of the workflow and potentially other workflows across a plurality of iterations and identify similar/divergent cohort/subgroups that generated undesired (or desired) model outputs. The observability module, when monitoring workflow execution, can continuously monitor the input data/workflow configurations and intermediate output, including any quality issues associated therewith, and detect anomalous degradations in workflow execution across the iterations and using user-defined metrics/benchmarks.

Based on the monitoring and analysis of the ongoing workflow execution and intermediate outputs, processing can estimate whether a workflow's predicted output metrics are undesired (or desired). Knowledge graph(s) can be defined by users and/or automatically from domain knowledge for the requisite components of the target metrics outputs. Acceptable variability of projected output metrics (as predicted by a Bayesian neural network after progression through each workflow state, for instance) can be specified as well.

Information gathered from the iterative workflow execution can be built up also. Intermediate model outputs could be represented in a unified intermediate representation using ontology and embeddings with each node and their relationships receiving an embedding vector to define the intermediate model outputs (information content) and their interconnectedness. In this manner, at least one knowledge graph can be built based on the intermediate output of the workflow execution at each iteration of the iterating, where the intermediate output is represented in a unified intermediate representation implemented using an ontology and further using embedding vectors that define the intermediate output of the workflow execution at each iteration of the iterating and interconnectedness of the intermediate output. In examples, the unified intermediate representation is a latent, disentangled intermediate representation that can jointly embed mutual information of the expected/desired, and undesired, model output ontologies. Such as joint embedding may allow for efficient prediction and analysis of target output metrics.

In additional aspects, a process modified workflow execution to halt the execution based on the analysis of predicted output metrics. In examples, a process can inject code to halt or change the workflow execution. This could be done in a way that it is hidden from a user. In some examples, a process runs sensitivity analyses in the background (via iterative workflow execution) and is able to change parameters of workflows that are executing and expected/predicted to deliver undesirable output metrics. In some examples, the process restarts the workflow from the beginning or from a specified checkpoint or timestamp, and can optionally use what was learned during the halted run when restarting the workflow, to help avoid or minimize unnecessary processing.

Figure 6:
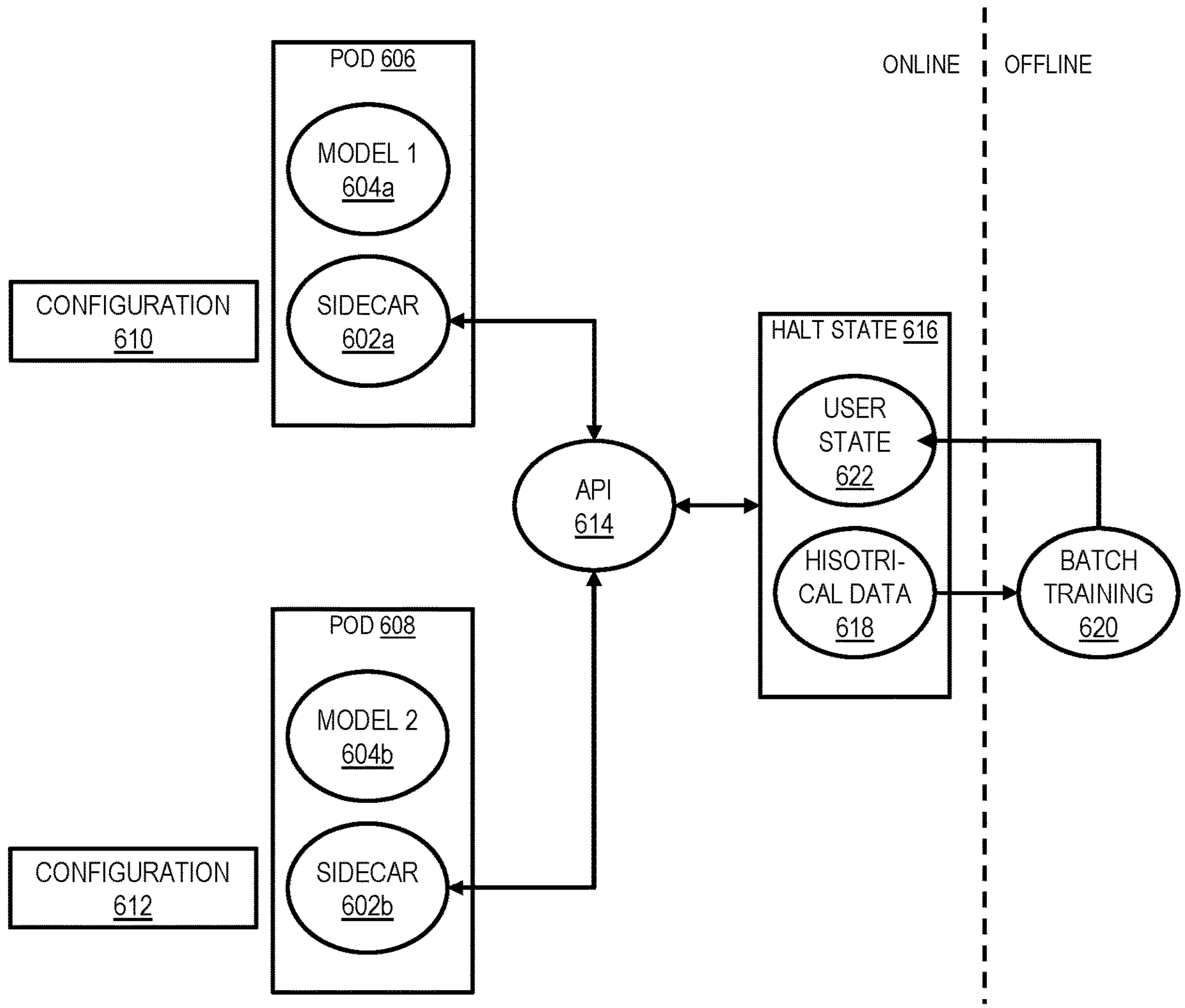
FIG. 6 depicts an example observability module implementation in a cloud environment, in accordance with aspects described herein.

One approach to monitoring workflow execution and feeding results back, via an API for example, for training purposes is described with reference to FIG. 6, depicting an example observability module implementation in a cloud environment, in accordance with aspects described herein. In the example of FIG. 6, the observability module runs as a centralized multi-agent-AI based module to monitor and analyze ongoing workflow execution and intermediate outputs as well as predicted output metrics. This is implemented as a stateless component 602*a*, 602*b* in this example, for instance as a container, a process, etc., in a sidecar pattern to the main model task (workflow) (604*a*, 604*b*). The two run together as a single unit in a pod (606, 608) executing in a cloud environment, such as a hybrid cloud, with an option to inject a user specified configuration 610, 612 into a respective sidecar component implementing the observability module activity for a given workflow. In this manner, the observability module is implemented as a stateless sidecar component to a model task executing the workflow, the sidecar component and model task execute as part of a single pod on a hybrid cloud platform, and the sidecar component is configured for automated injection of a user-specified workflow configuration into the observability module for use in workflow execution. Sidecars can be added seamlessly and independently of workflows.

The sidecar can monitor the workflow execution and react to changes in the workflow intermediate output and/or predicted output metrics. The sidecar could hold the monitoring and halting logic, and communicate with a central workflow halting API 614. The API 614 could maintain halt state information 616 with the state of historical runs 618 for user preference training and user provided halt options 622 based on defaults and/or trained models. The historical state 618 may be used to train 620 a machine learning model, for instance as a periodic offline job for the given user.

Provided herein are approaches for dynamic, predictive inferencing of output metrics of interest and leveraging geospatial-temporal context to build-up transferrable knowledge. While some other approaches provide for workflow halting, restarting, sanity checks and operation selection, and workflow steering, such other approaches fail to provide dynamic, predictive inferencing, based on intermediate states, with regard to target output metrics, and further fail to leverage geospatial-temporal context to build transferable knowledge and make inferences based on previous experience (e.g., workflow runs).

Figure 7:
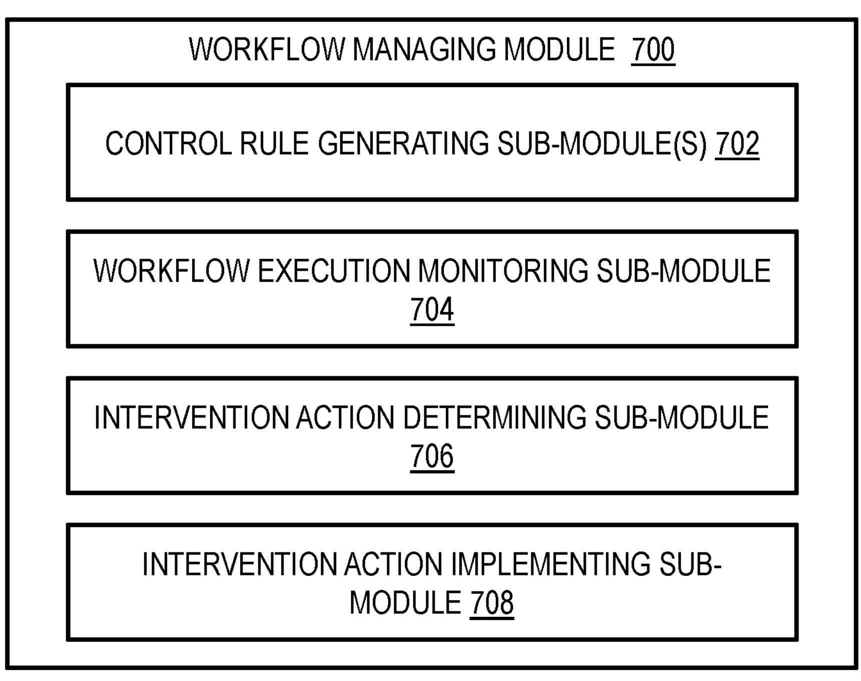
FIG. 7 depicts further details of an example workflow managing module to incorporate and/or use aspects described herein.

FIG. 7 depicts further details of an example workflow managing module (e.g., workflow managing module 700 of FIG. 1) to incorporate and/or use aspects described herein. Workflow managing module 700 includes various sub-modules to be used to perform workflow management as described herein. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Referring to FIG. 7, workflow managing module 700 includes control rule generating sub-module(s) 702 for generating a collection of workflow execution control rules based on target output metrics for a geospatial-temporal modeling workflow, workflow execution monitoring sub-module 704 for monitoring execution of the workflow at runtime, intervention action determining sub-module 706 for determining workflow execution intervention action(s) to take based on the defined target output metrics and the monitoring of the workflow execution, and intervention action implementing sub-module 708 for taking/implementing determined workflow execution intervention action(s). Module 700 and/or sub-modules thereof can execute to perform aspects described herein.

Figure 8:
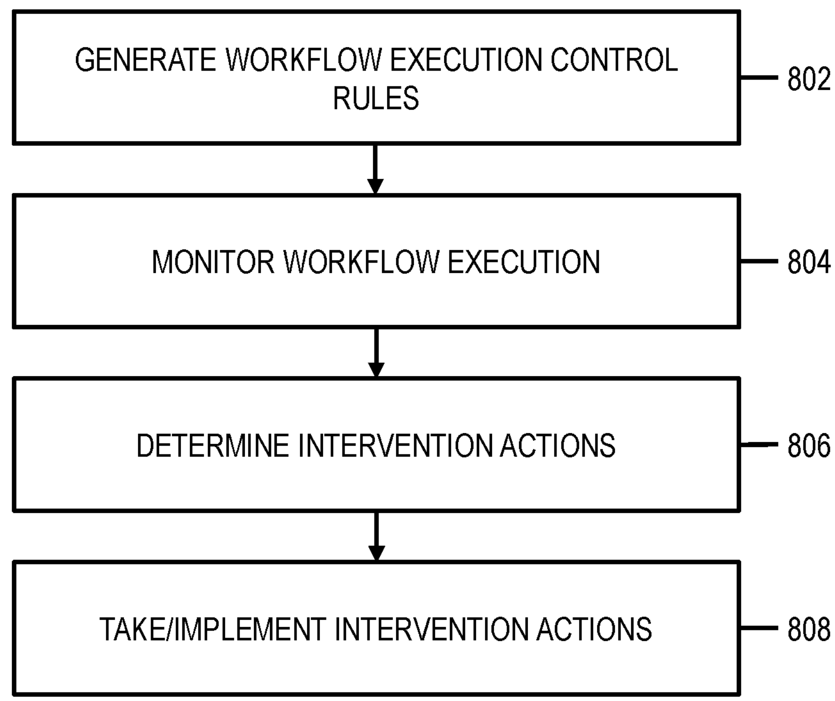
FIG. 8 depicts an example process for management of workflow execution, in accordance with aspects described herein.

FIG. 8 depicts an example process for management of workflow execution, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 8 are part of a module, such as module 700 and/or sub-module(s) thereof. In other examples, the code may be included in one or more modules and/or in one or more sub-modules of the one or more modules. Various options are available.

The process of FIG. 8 includes generating (802), based on target output metrics for a geospatial-temporal modeling workflow, a collection of workflow execution control rules. Generating the collection of workflow execution control rules can include generating static and/or dynamic execution control rules. In examples, the process generates at least one static execution control rule to control workflow execution, and this generating of the at least one static execution control rule is based on (i) user preferences and/or (ii) domain expert knowledge that inform workflow execution context.

The process of FIG. 8 also includes monitoring (804) execution of the workflow at runtime. The monitoring can include monitoring intermediate output of the workflow execution and predicted output metrics, where the predicted output metrics are metrics predicted to be obtained from completing the workflow. In connection with the workflow execution, the process can also apply a static execution control rule, of the at least one static execution control rule, for evaluation based on a current workflow configuration, determine as a result of the applying, to commence the workflow execution, and initiate commencement of the workflow execution.

As noted, the process can generate, as part of the collection of workflow execution control rules, at least one dynamic execution control rule, for instance by iterating execution of the workflow with different workflow configurations. The iterating can include, at each iteration of the iterating, predicting, using an artificial intelligence (AI) model trained to predict output metrics, output metrics at the iteration based on intermediate output of the workflow execution at the iteration, and comparing, using the predicted output metrics at the iteration, (i) allowing the workflow execution at the iteration to proceed to an end of the workflow with (ii) halting, reconfiguring, and re-initiating workflow execution from a prior point of the workflow using a different workflow configuration. The process can then build the at least one dynamic execution control rule based on thresholds derived from the iterating. An example dynamic execution control rule of the at least one dynamic execution control rule can suggest a changed workflow configuration to use in a subsequent execution of the workflow. In some embodiments, the predicting and the comparing are performed at a plurality of points during workflow execution at the iteration. In some embodiments, the process also performs, in connection with the monitoring, building at least one knowledge graph based on the intermediate output of the workflow execution at each iteration of the iterating, where the intermediate output is represented in a unified intermediate representation implemented using an ontology and further using embedding vectors that define the intermediate output of the workflow execution at each iteration of the iterating and interconnectedness of the intermediate output.

The process of FIG. 8 also includes determining (806) one or more workflow execution intervention actions for an actor, such as an automated workflow orchestrator, to take based on the defined target output metrics and the monitoring of the workflow execution. In some examples, the process also takes/implements (808) the determined intervention actions.

In some embodiments, the one or more workflow execution intervention actions include an action to halt workflow execution based on at least one of the intermediate output and the predicted output metrics. Additionally or alternatively, the one or more workflow execution intervention actions include an action to perform changing a workflow configuration according to which the workflow is executed and/or reinitiating workflow execution with a changed workflow configuration, such as a configuration that was just changed or a different workflow configuration.

In some embodiments, an automated workflow orchestrator orchestrates execution of a collection of workflows that includes the workflow and other workflows, and the one or more workflow execution intervention actions includes a decision to change execution priority of at least one of (i) the workflow and (ii) one or more of the other workflows. The automated workflow orchestrator could include an observability module configured to perform the monitoring the execution of the workflow, and to use the generated collection of workflow execution control rules to determine the one or more workflow execution intervention actions. In some examples, the observability module is implemented as a stateless sidecar component to a model task executing the workflow, and the sidecar component and model task execute as part of a single pod on a hybrid cloud platform. Optionally, the sidecar component could be configured for automated injection of a user-specified workflow configuration into the observability module for use in workflow execution.

Although various embodiments are described above, these are only examples.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

executing one or more computational workflows under varying workflow configurations of the one or more computational workflows to obtain output metrics of interest as a result of the executing the one or more computational workflows;

training an artificial intelligence (AI) model using the obtained output metrics of interest to make predictions, during runtime, of output metrics of executing computational workflows;

generating, based at least in part on the obtained output metrics of interest, a collection of workflow execution control rules that control workflow execution of an executing workflow to enforce target metrics;

commencing workflow execution of a computational workflow and monitoring the execution of the computational workflow at runtime, the monitoring comprising monitoring intermediate output of the workflow execution, obtained prior to completion of the computational workflow, and predicting, using the trained AI model, output metrics predicted to be obtained from completing the computational workflow; and determining workflow execution intervention actions for an automated workflow orchestrator to take based on the predicted output metrics predicted by the trained AI model to be obtained from completing the computational workflow and based on at least one workflow execution control rule, of the collection of workflow execution control rules, to control workflow execution of the computational workflow and enforce target output metrics for the computational workflow, wherein the workflow execution intervention actions include halting, reconfiguring, and re-initiating workflow execution of the computational workflow from a prior point of the computational workflow using a different computational workflow configuration of the computational workflow, based on computational resource cost if the workflow execution were allowed to proceed.

2. The method of claim 1, wherein the generating the collection of workflow execution control rules comprises generating at least one static execution control rule to control workflow execution, the generating the at least one static execution control rule being based on at least one selected from the group consisting of (i) user preferences and (ii) domain expert knowledge that inform workflow execution context.

3. The method of claim 2, further comprising:

applying a static execution control rule, of the at least one static execution control rule, for evaluation based on a current workflow configuration;

determining, as a result of the applying, to commence the workflow execution; and initiating the commencement of the workflow execution.

4. The method of claim 2, wherein the generating the collection of workflow execution control rules comprises generating at least one dynamic execution control rule by:

iterating execution of the one or more computational workflows under the varying workflow configurations, wherein the iterating comprises, at each iteration of the iterating:

predicting, using the AI model, output metrics predicted to be obtained from completing the one or more computational workflows at the iteration based on intermediate outputs of the workflow execution of the one or more computational workflows at the iteration; and for each given computational workflow of the one or more computational workflows, comparing, using the predicted output metrics predicted to be obtained from completing the given computational workflow at the iteration, (i) allowing the workflow execution of the given computational workflow to proceed to an end of the given computational workflow at the iteration with (ii) halting, reconfiguring, and re-initiating the workflow execution of the given computational workflow from a prior point of the given computational workflow using a different workflow configuration; and building the at least one dynamic execution control rule based on thresholds derived from the iterating.

5. The method of claim 4, wherein a dynamic execution control rule of the at least one dynamic execution control rule suggests a changed workflow configuration to use in a subsequent execution of the computational workflow.

6. The method of claim 4, wherein the predicting the output metrics predicted to be obtained from completing the given computational workflow and the comparing are performed at a plurality of points during workflow execution of the given computational workflow at the iteration.

7. The method of claim 4, wherein the method further comprises building at least one knowledge graph based on the intermediate outputs of the workflow execution of the one or more computational workflows at each iteration of the iterating, the intermediate outputs being represented in a unified intermediate representation implemented using an ontology and further using embedding vectors that define the intermediate outputs of the workflow execution of the one or more computational workflows at each iteration of the iterating and interconnectedness of the intermediate outputs.

8. The method of claim 1, wherein the automated workflow orchestrator orchestrates the execution of the one or more computational workflows, the one or more computational workflows includes the computational workflow for which execution is commenced by the commencing and other workflows, and wherein the workflow execution intervention actions comprise a decision to change execution priority of at least one of (i) the computational workflow and (ii) one or more of the other workflows.

9. The method of claim 1, wherein the automated workflow orchestrator comprises an observability module configured to perform the monitoring the execution of the computational workflow, and use the generated collection of workflow execution control rules to determine the workflow execution intervention actions.

10. The method of claim 9, wherein the observability module is implemented as a stateless sidecar component to a model task executing the computational workflow, and wherein the sidecar component and model task execute as part of a single pod on a hybrid cloud platform.

11. The method of claim 10, wherein the sidecar component is configured for automated injection of a user-specified workflow configuration into the observability module for use in workflow execution.

12. A computer system comprising:

a memory; and a processor in communication with the memory, wherein the computer system is configured to perform a method comprising:

executing one or more computational workflows under varying workflow configurations of the one or more computational workflows to obtain output metrics of interest as a result of the executing the one or more computational workflows;

training an artificial intelligence (AI) model using the obtained output metrics of interest to make predictions, during runtime, of output metrics of executing computational workflows;

generating, based at least in part on the obtained output metrics of interest, a collection of workflow execution control rules that control workflow execution of an executing workflow to enforce target metrics;

commencing workflow execution of a computational workflow and monitoring the execution of the workflow at runtime, the monitoring comprising monitoring intermediate output of the workflow execution, obtained prior to completion of the computational workflow, and predicting, using the trained AI model, output metrics, predicted to be obtained from completing the computational workflow; and determining workflow execution intervention actions for an automated workflow orchestrator to take based on the predicted output metrics predicted by the trained AI model to be obtained from completing the computational workflow and based on at least one workflow execution control rule of the collection of workflow execution control rules, to control workflow execution of the computational workflow and enforce target output metrics for the computational workflow, wherein the workflow execution intervention actions include halting, reconfiguring, and re-initiating workflow execution of the computational workflow from a prior point of the computational workflow using a different computational workflow configuration of the computational workflow, based on computational resource cost if the workflow execution were allowed to proceed.

13. The computer system of claim 12, wherein the generating the collection of workflow execution control rules comprises:

generating at least one static execution control rule to control workflow execution, the generating the at least one static execution control rule being based on at least one selected from the group consisting of (i) user preferences and (ii) domain expert knowledge that inform workflow execution context; and generating at least one dynamic execution control rule by:
iterating execution of the one or more computational workflows under the varying workflow configurations, wherein the iterating comprises, at each iteration of the iterating:
predicting, using the AI model, output metrics predicted to be obtained from completing the one or more computational workflows at the iteration based on intermediate outputs of the workflow execution of the one or more computational workflows at the iteration; and
for each given computational workflow of the one or more computational workflows, comparing, using the predicted output metrics predicted to be obtained from completing the given computational workflow at the iteration, (i) allowing the workflow execution of the given computational workflow to proceed to an end of the given computational workflow at the iteration with (ii) halting, reconfiguring, and re-initiating the workflow execution of the given computational workflow from a prior point of the given computational workflow using a different workflow configuration; and
building the at least one dynamic execution control rule based on thresholds derived from the iterating.

14. The computer system of claim 12, wherein the automated workflow orchestrator orchestrates the execution of the one or more computational workflows, wherein the one or more computational workflows includes the computational workflow for which execution is commences by the commencing and other workflows, and wherein the one or more workflow execution intervention actions comprises a decision to change execution priority of at least one of (i) the computational workflow and (ii) one or more of the other workflows.

15. A computer program product comprising:
a computer readable storage medium readable by a processing circuit and storing instructions for execution by the processing circuit to perform a method comprising:
executing one or more computational workflows under varying workflow configurations of the one or more computational workflows to obtain output metrics of interest as a result of the executing the one or more computational workflows;
training an artificial intelligence (AI) model using the obtained output metrics of interest to make predictions, during runtime, of output metrics of executing computational workflows;
generating, based at least in part on the obtained output metrics of interest, a collection of workflow execution control rules that control workflow execution of an executing workflow to enforce target metrics;
commencing workflow execution of a computational workflow and monitoring the execution of the computational workflow at runtime, the monitoring comprising monitoring intermediate output of the workflow execution, obtained prior to completion of the computational workflow, and predicting, using the trained AI model, output metrics predicted to be obtained from completing the computational workflow; and
determining workflow execution intervention actions for an automated workflow orchestrator to take based on the predicted output metrics predicted by the trained AI model to be obtained from completing the computational workflow and based on at least one workflow execution control rule of the collection of workflow execution control rules, to control workflow execution of the computational workflow and enforce target output metrics for the computational workflow, wherein the workflow execution intervention actions include halting, reconfiguring, and re-initiating workflow execution of the computational workflow from a prior point of the computational workflow using a different computational workflow configuration of the computational workflow, based on computational resource cost if the workflow execution were allowed to proceed.

16. The computer program product of claim 15, wherein the generating the collection of workflow execution control rules comprises:
generating at least one static execution control rule to control workflow execution, the generating the at least one static execution control rule being based on at least one selected from the group consisting of (i) user preferences and (ii) domain expert knowledge that inform workflow execution context; and
generating at least one dynamic execution control rule by:
iterating execution of the one or more computational workflows under the varying workflow configurations, wherein the iterating comprises, at each iteration of the iterating:
predicting, using the AI model, output metrics predicted to be obtained from completing the one or more computational workflows at the iteration based on intermediate outputs of the workflow execution of the one or more computational workflows at the iteration; and
for each given computational workflow of the one or more computational workflows, comparing, using the predicted output metrics predicted to be obtained from completing the given computational workflow at the iteration, (i) allowing the workflow execution of the given computational workflow to proceed to an end of the given computational workflow at the iteration with (ii) halting, reconfiguring, and re-initiating the workflow execution of the given computational workflow from a prior point of the given computational workflow using a different workflow configuration; and
building the at least one dynamic execution control rule based on thresholds derived from the iterating.

* * * * *